United States Patent
Luo et al.

(10) Patent No.: US 8,285,919 B2
(45) Date of Patent: Oct. 9, 2012

(54) SSD WITH IMPROVED BAD BLOCK MANAGEMENT

(75) Inventors: Jianjun Luo, Los Gatos, CA (US); ChuanJen Tsu, Saratoga, CA (US)

(73) Assignee: Initio Corporation, San Jose, CA (US)

( * ) Notice: Subject to any disclaimer, the term of this patent is extended or adjusted under 35 U.S.C. 154(b) by 402 days.

(21) Appl. No.: 12/693,826

(22) Filed: Jan. 26, 2010

(65) Prior Publication Data

US 2010/0122022 A1    May 13, 2010

Related U.S. Application Data (63) Continuation-in-part of application No. 12/468,748, filed on May 19, 2009, now Pat. No. 8,244,961.

(60) Provisional application No. 61/056,308, filed on May 27, 2008.

(51) Int. Cl.
*G06F 12/00* (2006.01)

(52) U.S. Cl. .................................... 711/103; 711/114

(58) Field of Classification Search .................. 711/103, 711/114

See application file for complete search history.

(56) References Cited

U.S. PATENT DOCUMENTS

| | | | |
|---|---|---|---|
| 6,230,234 B1 | 5/2001 | Estakhri et al. | |
| 7,127,668 B2 | 10/2006 | McBryde et al. | |
| 7,373,452 B2 | 5/2008 | Suh | |
| 2005/0120157 A1 | 6/2005 | Chen et al. | |
| 2006/0161716 A1 | 7/2006 | Lin | |
| 2006/0181912 A1 | 8/2006 | Lyer et al. | |
| 2007/0061502 A1 | 3/2007 | Lasser et al. | |
| 2007/0067559 A1* | 3/2007 | Fujibayashi et al. | 711/112 |
| 2007/0158808 A1 | 7/2007 | Bruce et al. | |
| 2007/0180328 A1 | 8/2007 | Cornwell et al. | |
| 2008/0016269 A1 | 1/2008 | Chow et al. | |
| 2008/0040531 A1 | 2/2008 | Anderson | |
| 2008/0046638 A1 | 2/2008 | Maheshwari et al. | |
| 2008/0082736 A1* | 4/2008 | Chow et al. | 711/103 |
| 2008/0112238 A1 | 5/2008 | Kim et al. | |
| 2008/0114924 A1 | 5/2008 | Frayer et al. | |
| 2009/0083476 A1* | 3/2009 | Pua et al. | 711/103 |

OTHER PUBLICATIONS

International Report on Patentability issued Dec. 9, 2010 and Written Opinion issued Nov. 5, 2009 in counterpart PCT Application No. PCT/US2009/045329.

* cited by examiner

*Primary Examiner* — Michael Tran
(74) *Attorney, Agent, or Firm* — Duane Morris LLP (57) ABSTRACT

In some embodiments, a memory controller includes a plurality of processors of a first type and a processor of a second type coupled to the processors of the first type. Each of the plurality of processors of the first type is configured to determine a bad block rate of a memory channel of a solid state memory device to which it is configured to be coupled. The processor of the second type is configured to receive the bad block data rates from each of the plurality of processors of the first type and to report one of a total capacity or a bad block rate of the solid state memory device to a host device. The total capacity and the bad block rate of the solid state memory device are based on the bad block rates received from each of the plurality of processors of the first type.

18 Claims, 10 Drawing Sheets

FIG. 8

SSD WITH IMPROVED BAD BLOCK MANAGEMENT

CROSS-REFERENCE TO RELATED APPLICATIONS

This application is a continuation-in-part of U.S. patent application Ser. No. 12/468,748 filed May 19, 2009, which claims priority to U.S. Provisional Patent Application No. 61/056,308, filed on May 27, 2008, both of which are incorporated by reference herein in their entireties.

FIELD OF DISCLOSURE

The disclosed embodiments relate to storage devices. More specifically, the disclosed embodiments relate to solid-state drives.

BACKGROUND

Solid-state drives (SSD) are a form of data storage that use a solid-state memory to store data. Examples of solid state memory include static random access memory (SRAM), dynamic random access memory (DRAM), and flash memory. Unlike conventional disk drives that include several moving components, an SSD does not have moving parts as data are stored electronically and not on a rotating disk. As a result, SSDs experience fewer mechanical failures as they do not include as many moving parts as conventional hard disk drives. SSDs typically have faster startup times compared to conventional hard disk drives as SSDs do not require time for a disk to spin up to a particular speed in order for data to be written to, or read from, the disk.

An SSD may include a plurality of NAND flash memory cells or DRAM memory cells. NAND flash memory may be implemented using single-level cells (SLCs) or multi-level cells (MLCs). SLC flash memory stores a single bit of data per cell, and MLC flash memory stores two or more bits of data per cell. Accordingly, MLC flash has a higher density than that of SLC flash and is more commonly used in an SSD than SLC flash due to its lower price and higher capacity. However, SLC flash typically has a lower bit error rate (BER) making it more reliable than its more complex MLC counterpart.

One drawback of flash memory is that it has a finite number of erase-write cycles regardless of whether it is implemented as SLC or MLC. Wear-leveling operations are typically implemented to prolong the life of the flash memory by spreading out the write operations among the flash units of a flash group so that one flash unit is not constantly being written to and erased. These wear-leveling operations, along with bad block management, error correction, and the coordination of read and write cycles, are typically performed or managed by a single flash controller. However, these conventional flash controllers provide slow read and write times.

Figure 6A:
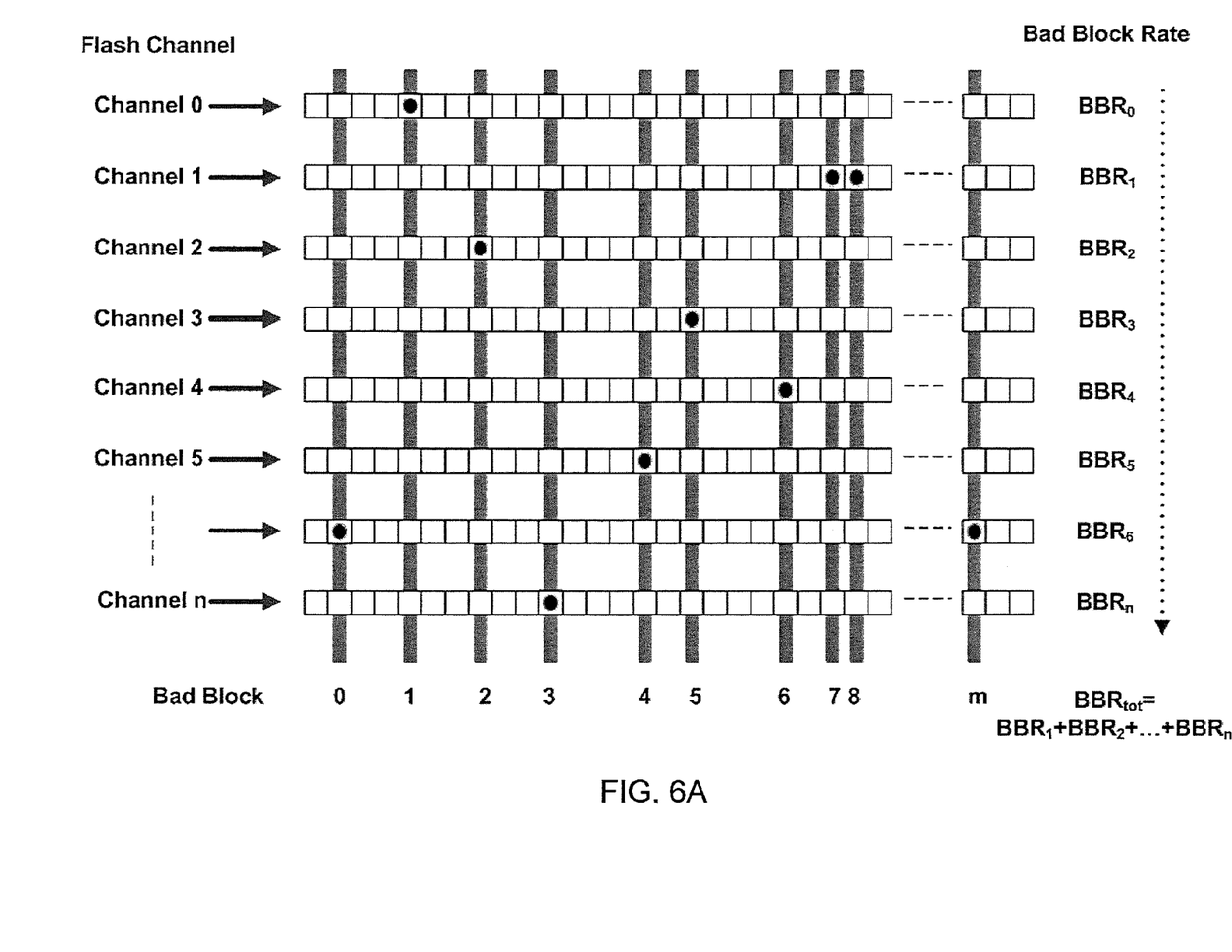
FIGS. 6A and 6B are block diagrams of bad block management in a conventional solid state drive architecture.

Another drawback of SSDs is that they are susceptible to having high bad block rates. FIG. 6A is a block diagram of a conventional SSD having channels 0-$n$ and $m$ bad memory blocks. Each of the channels of memory are bundled together as all of the memory channels are managed by a single memory controller. The bad block rate ("BBR") of a memory channel of the SSD is determined by dividing the number of bad blocks in the memory channel by the total number of memory blocks in the memory channel. The total BBR of the SSD is determined by summing together the BBRs of all of the memory channels as each of the memory channels are effectively coupled together, and a bad block in one memory channel causes a bad block in each of the other memory channels as illustrated in FIG. 6A.

Figure 6B:
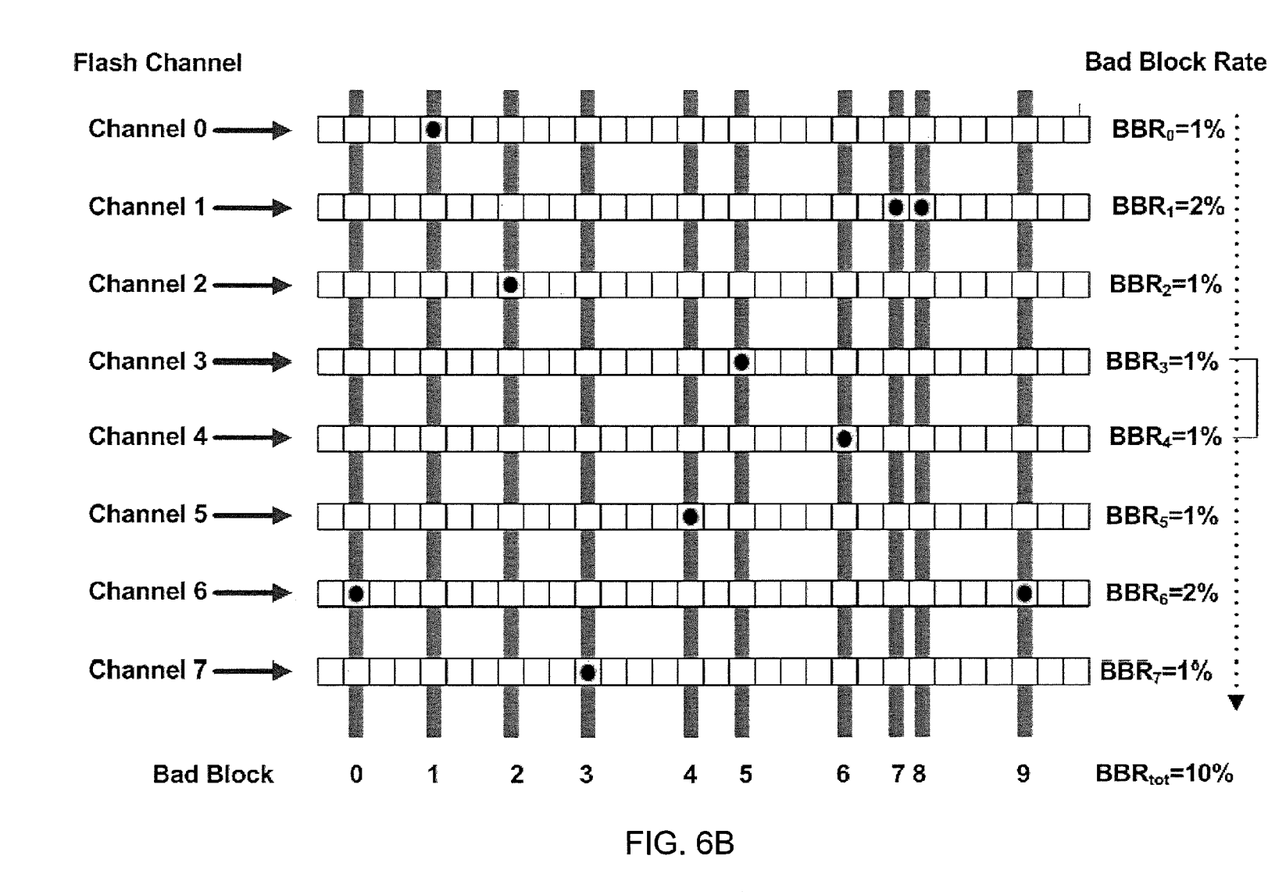

For example, FIG. 6B is a block diagram of a conventional SSD having eight memory channels. Assuming that each memory channel has 100 blocks, then the BBR for the first channel, $BBR_0$, is one percent as there is one bad block out of 100 total blocks, and the BBR for the second channel, $BBR_1$, is two percent. The total BBR for the SSD, $BBR_{tot}$, is ten percent, which is the sum of $BBR_0$ through $BBR_7$. This method of bad block management may create a greater total BBR, $BBR_{tot}$, that is n times greater than a BBR of an individual memory channel. The higher the BBR an SSD has translates to a lower total storage capacity of the SSD as bad blocks are no longer used for data storage.

Accordingly, an improved solid-state memory architecture and bad block management method are desirable.

SUMMARY

In some embodiments, a memory controller includes a plurality of processors of a first type and a processor of a second type coupled to the processors of the first type. Each of the plurality of processors of the first type is configured to determine a bad block rate of a memory channel of a solid state memory device to which it is configured to be coupled. The processor of the second type is configured to receive the bad block data rates from each of the plurality of processors of the first type and to report one of a total capacity or a bad block rate of the solid state memory device to a host device. The total capacity and the bad block rate of the solid state memory device are based on the bad block rates received from each of the plurality of processors of the first type.

In some embodiments, a method of performing bad block management of a solid state drive (SSD) includes identifying a first number of bad memory blocks of a first memory channel of the SSD at a first processor of a first type, identifying a second number of bad memory blocks of a second memory channel of the SSD at a second processor of the first type, and calculating a bad block rate of the first memory channel at the first processor of the first type and a bad block rate of the second memory channel at the second processor of the first type. The bad block rate of the first memory channel is based on the first number of bad memory blocks, and the bad block rate of the second memory channel is based on the second number of bad memory blocks. A bad block rate of the SSD is determined at a processor of a second type, which is coupled to each of the processors of the first type. One of a memory capacity value of the SSD or the bad block rate of the SSD is transmitted from the processor of the second type to a host device. The bad block rate of the SSD and the memory capacity value of the SSD are based on the bad block rates calculated by the processors of the first type.

In some embodiments, a system includes a memory controller coupled to a host device and to a solid state drive (SSD) having a plurality of memory channels. The memory controller includes a plurality of processors of a first type and a processor of a second type in signal communication with each of the plurality of processors of the first type. Each of the plurality of processors of a first type is coupled to at least one of the plurality of memory channels of the SSD. Each of the processors of the first type is configured to identify a number of bad memory blocks in the memory channel to which it is coupled and to determine a bad block rate of the memory channel to which it is coupled based on the number of bad memory blocks in the memory channel. The processor of the second type is configured to receive the bad block rates from each of the plurality of processors of the first type and report one of a total capacity or a bad block rate of the SSD to the host device. The total capacity and the bad block rate of the SSD are based on the bad block rates received from each of the plurality of processors of the first type.

DETAILED DESCRIPTION

Figure 1:
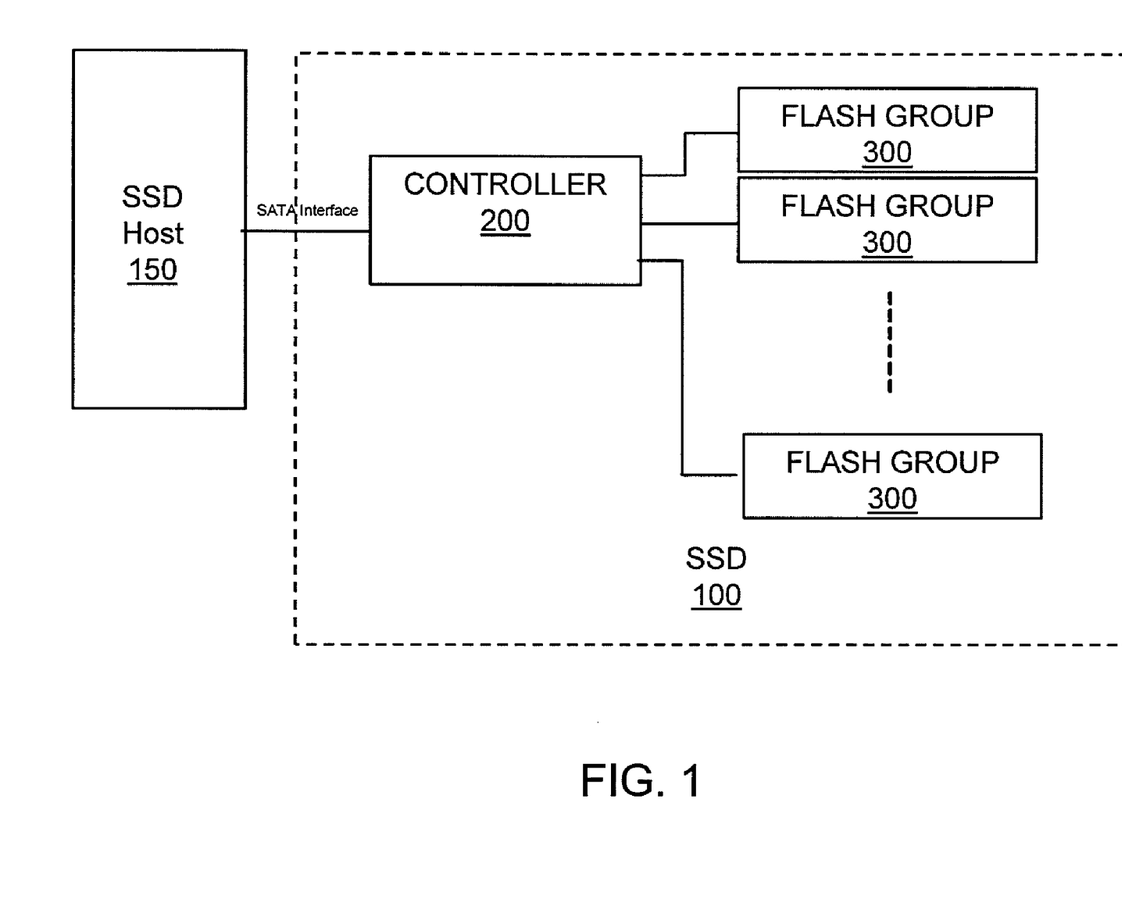
FIG. 1 is a block diagram of one example of a solid-state drive (SSD).

FIG. 1 is a block diagram of one example of an SSD 100 connected to a host 150. Host 150 may be a personal computer such as a laptop or desktop, a workstation, a server, or any device having a central processing unit (CPU). Additionally, host 150 may be configured to run any type of operating system including, but not limited to, Microsoft® Windows, Microsoft® Vista, Linux, UNIX, Mac OS X, FreeBSD®, or the like.

Figure 2:
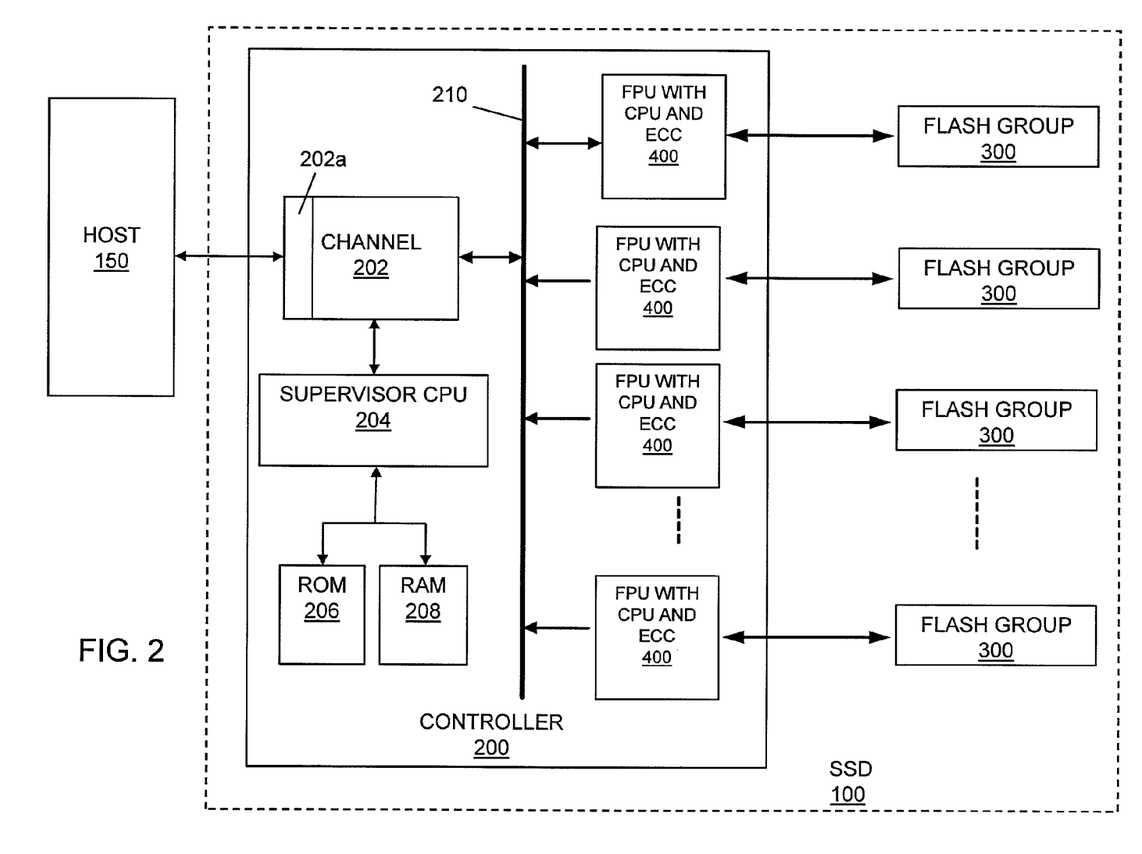
FIG. 2 is a block diagram of the structural and functional components of the controller of the SSD shown in FIG. 1.

As shown in FIG. 1, SSD 100 includes a controller 200 in data communication with a plurality of flash groups 300. In some embodiments, controller 200 may implemented as a single integrated circuit chip. Controller 200 may be configured to perform management operations for the plurality of flash groups 300, which may include single-level cell (SLC) flash, multi-level cell (MLC) flash, or a combination of SLC and MLC. Each flash group 300 may include one or more flash memory units 304. FIG. 2 is a block diagram of the structural and functional components of one example of the controller 200 shown in FIG. 1. As shown in FIG. 2, controller 200 includes a channel 202, a supervisor CPU 204, a read-only memory (ROM) 206, a random-access memory (RAM) 208, and one or more flash processor units (FPU) 400. A bus 210 may connect each of the FPUs 400 to channel 202. Bus 210 may be a USB bus, SATA bus, or a self-defined bus.

Channel 202 may be configured to act as a bridge between host 150 and the FPUs 400 to enable data transfer between the flash groups 300 and host 150. In some embodiments, channel 202 is a serial advanced technology attachment (SATA) channel. However, channel 202 may be another type of serial data bus such as, for example, a universal serial bus (USB) channel. Channel 202 may include an interface 202a such as, for example, a SATA interface, a USB interface, or the like that may be configured to engage a corresponding interface of host 150.

Supervisor CPU 204 may be a processor, microprocessor, microcontroller, or like device configured to manage data transfer between the host 150 and each of the FPUs 400. ROM 206 may be any type of read-only memory including, but not limited to, programmable read-only memory (PROM), erasable programmable read-only memory (EPROM), or electrically erasable programmable read-only memory (EEPROM). RAM 208 may be any type of random-access memory such as, for example, static random-access memory (SRAM), or dynamic random-access memory (DRAM).

Figure 3:
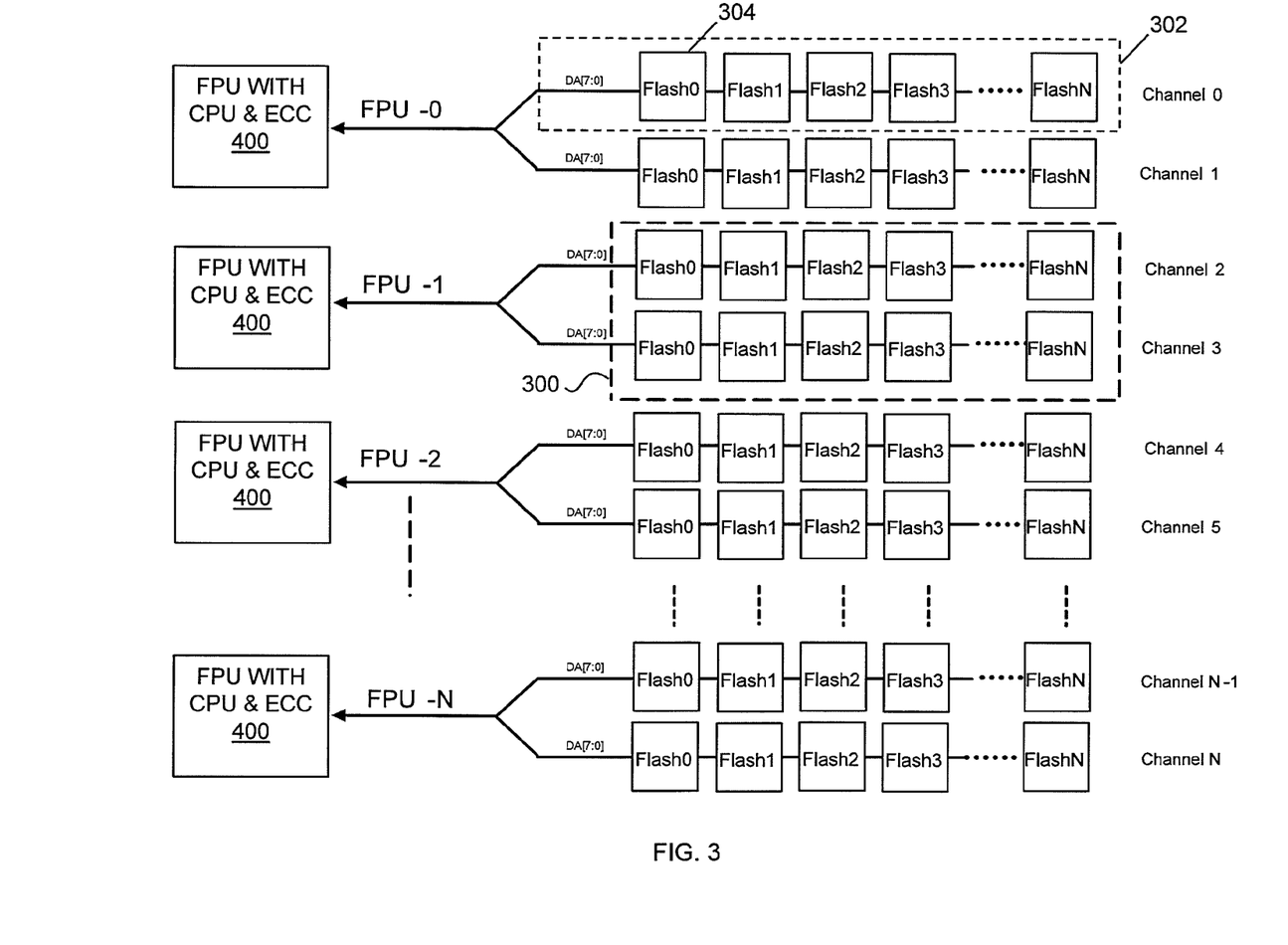
FIG. 3 is a block diagram of one example of the flash units connected to the flash processor units shown in FIG. 2.

FIG. 3 is a block diagram of one example of a connection between a plurality of FPUs 400 and flash groups 300. As shown in FIG. 3, each FPU 400 may be connected to a flash group 300. In some embodiments, each flash group 300 includes two flash channels 302, although fewer or more flash channels 302 may be implemented. Each flash channel 302 may include one or more flash memory units 304 that may be connected to one another in serial, parallel, or in some combination thereof. The number of flash groups 300 connected to the controller 200 may be varied depending on the data storage requirements of a particular system.

Figure 4:
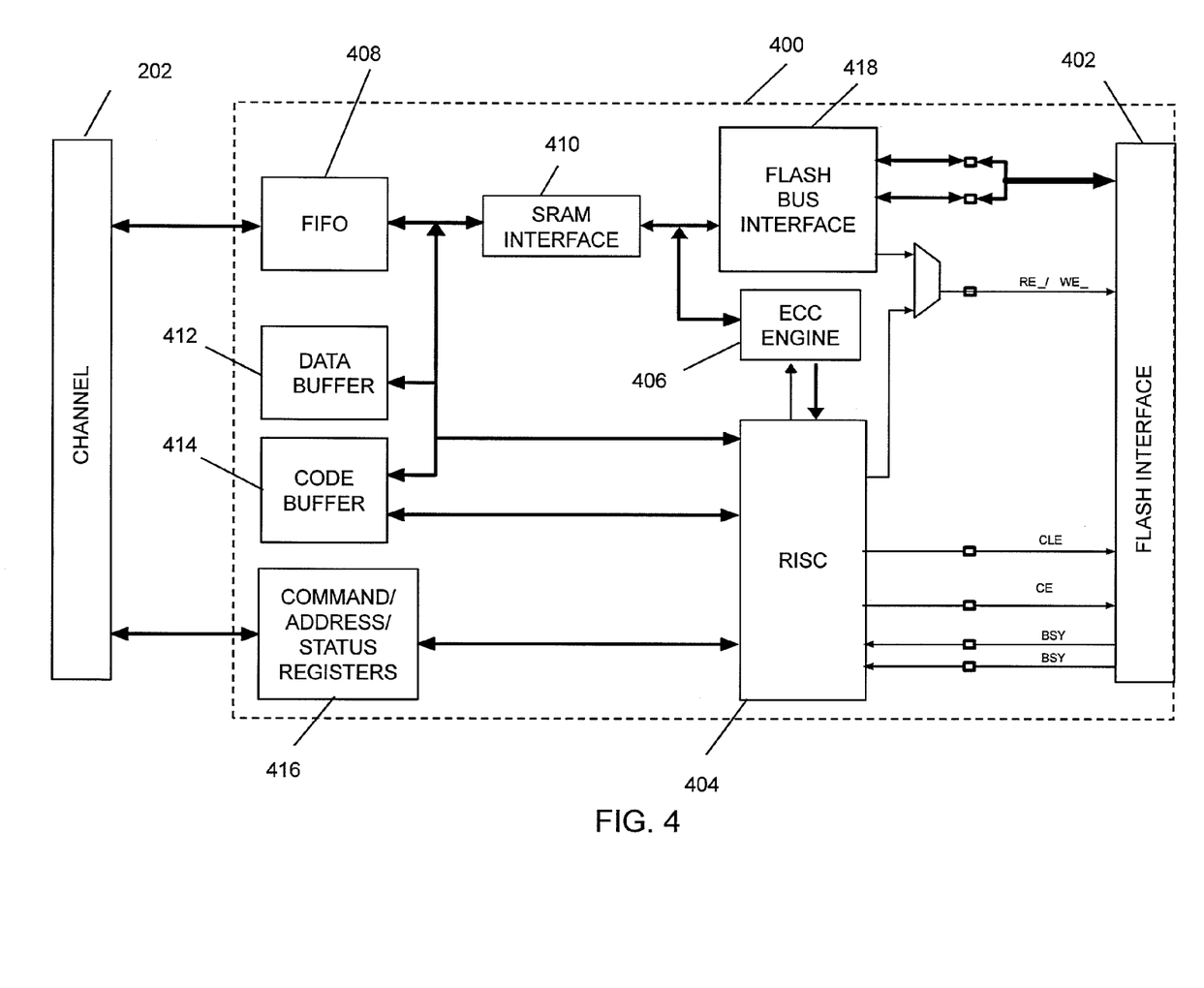
FIG. 4 is a block diagram of the structural and functional components of an FPU as shown in FIG. 2.
Figure 5:
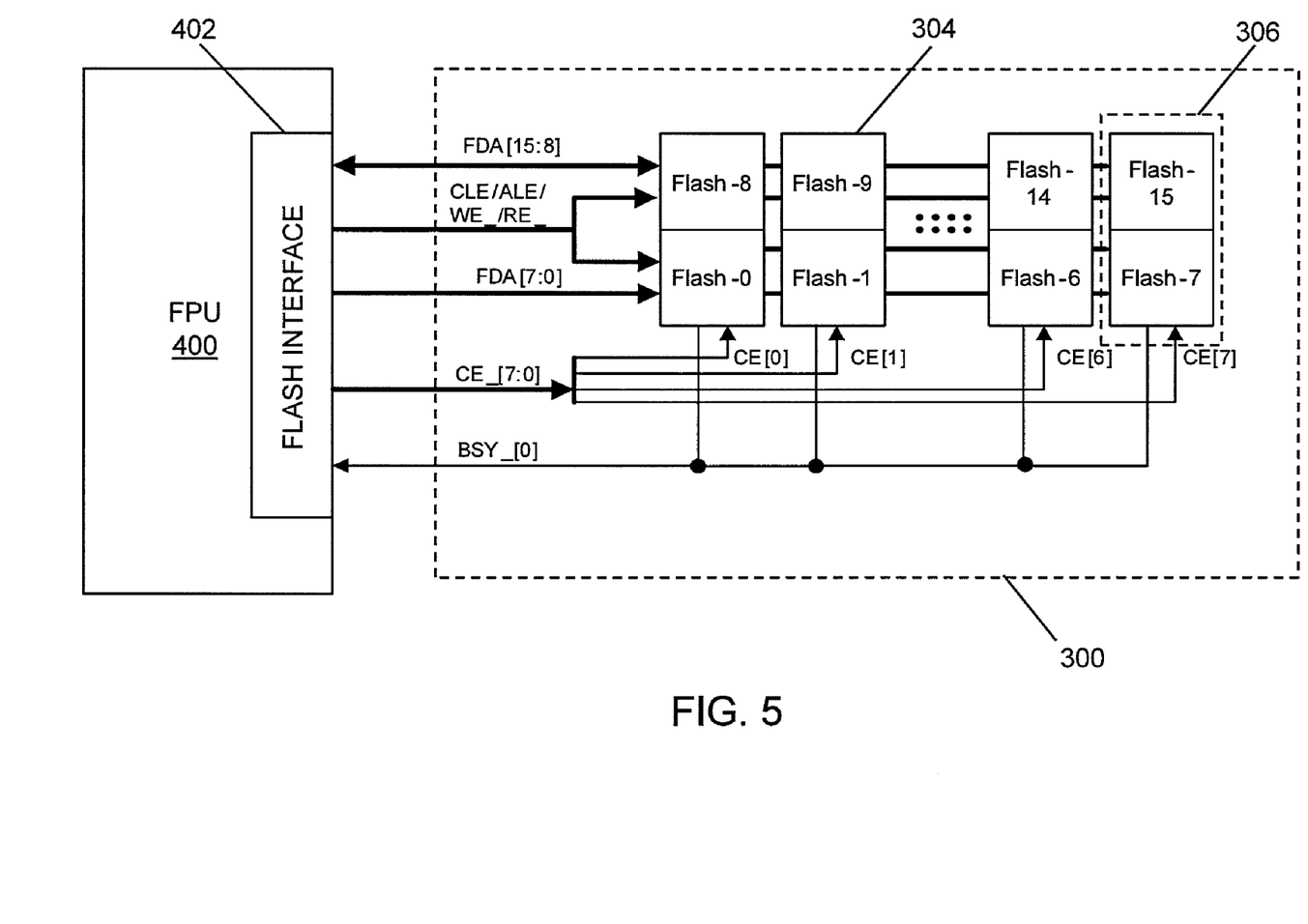
FIG. 5 is a block diagram of one example of a connection between a flash processor unit and a flash group shown in FIG. 3.

FIG. 5 is a block diagram of one example of a connection between an FPU 400 and a flash group 300 as illustrated in FIG. 3. As shown in FIG. 5, each FPU 400 may include a flash interface 402 through which the FPU 400 may be connected to a respective flash group 300. Flash interface 402 may include logic circuitry configured to select and deselect a flash sub-group 306 or a flash memory unit 304. Each FPU 400 may also include a processor such as a reduced instruction set computer (RISC) 404 (see FIG. 4) or other microprocessor units configured to perform one or more operations with respect to the flash group 300 as described below. In some embodiments, each FPU 400 includes an 8-bit RISC, although RISCs having other processing capabilities may be used. Examples of other microprocessors that may be implemented as an FPU include, but are not limited to, PIC16xx/17xx series microcontrollers available from Microchip Technology of Chandler, Ariz., MIPS architecture microprocessors available from MIPS Technologies of Mountain View, Calif., and 8051 microcontrollers. Each flash sub-group 306 may have a respective Chip Enable signal (CE), and all of the flash memory units 304 may be connected to the same flash control signal lines including, but not limited to, Command Latch Enable (CLE), Read (RE), and Write (WE) signal lines.

FIG. 4 is a block diagram illustrating one example of the structural and functional components of an FPU 400. As shown in FIG. 4, an FPU 400 may include a First-In-First-Out (FIFO) register 408 that may be connected to the channel 202, an SRAM interface 410, a data buffer 412, a code buffer 414, and the RISC 404. Command/address/status registers 416 may also be connected to channel 202 and to RISC 404. SRAM interface 410 may be connected to a flash bus interface 418 and an error correction code (ECC) engine 406. ECC engine 406 may be connected to RISC 404. Flash bus interface 418 and RISC 404 may be connected to the flash interface 402.

In some embodiments, FIFO 408 may be 2K by 32-bit data FIFO implemented using SRAM. Data buffer 412 and code buffer 414 may also be implemented using SRAM, although it is understood that FIFO 408, data buffer 412, and code buffer 414 may be implemented using other memory types or registers. FIFO 408, data buffer 412, and code buffer 414 are configured to receive and buffer the data received from, or being transmitted to, channel 202 via SRAM interface 410 and flash bus interface 418.

ECC engine 406 may be configured to execute an error correction coding on data being written to or read from a flash group 300 in conjunction with RISC 404. For example, the ECC may be a Hamming code, a Reed-Solomon code, or like code that may be used to determine and correct data errors.

RISC 404 may be configured to perform wear-leveling, bad block management, and other operations conventionally performed by a single flash controller. For example, a table may be stored in the flash groups 300 identifying the location of one or more bad blocks of data. These bad blocks may be the result of over-use and will be skipped when a data read/write is executed.

Each FPU 400 may include its own firmware, which may be different from the firmware of other FPUs 400 advantageously enabling each FPU 400 to perform different operations as well as enabling different types of flash blocks 300 to be connected to controller 200. For example, a first flash group 300 including a plurality of SLC flash memory units 304 may be connected to a first FPU 400, a second flash group 300 including a plurality of MLC flash memory units 304 may be connected to a second FPU 400, and a third flash group including a combination of SLC and MLC flash memory units may be connected to a third FPU 400. The first, second, and third FPUs 400 may each be configured with distinct firmware that enables the first FPU to perform error correction, bad block management, or the like on MLC flash units, the second FPU to perform error correction, bad block management, or the like on the SLC flash units, and the third FPU to perform error correction, bad block management, or the like on the combination of SLC and MLC flash units while each of the first, second, and third FPUs being managed by the same controller 200. Accordingly, the distributed architecture of controller 200 advantageously enables an SSD to be implemented having a blend of reliability and performance while at the same time reducing the amount of processing performed by the supervisor CPU 204. Additionally, the distributed architecture reduces the amount of processing performed by each processor increasing the performance of the SSD.

The operation of SSD 100 is now described with reference to FIGS. 1-4. When host 150 is powered on, ROM 206 may load firmware into RAM 208 for execution by supervisor CPU 204. The firmware loaded from ROM 206 may be specific to the operations that the supervisor CPU 204 will perform. For example, the firmware may instruct the supervisor CPU 204 to manage data transfer between the host 150 and each of the FPUs 400. Put another way, the supervisor CPU 204 may receive a data read or write request from host 150, which supervisor CPU 204 may then route to the appropriate FPU 400. Additionally, bus 210 may be configured to transmit busy and/or interrupt signals to and from supervisor CPU 204 and FPUs 400. For example, the supervisor CPU 204 may check the status of each of the FPUs 400 by checking the busy signal of each FPU 400. If the busy signal is low, for example, then the FPU 400 may be performing a read or write operation. If the busy signal is high, for example, then an FPU 400 may be available to perform a read or write operation, and the supervisor CPU 204 may send an interrupt signal to the FPU 400 to begin a flow of data between host 150 and an FPU 400. In this manner, the supervisor CPU 204 may act as a bus arbiter by coordinating the read and write requests from host 150 by issuing interrupt signals to the FPUs 400 and checking the busy signals of the FPUs 400 to coordinate the transfer of data between the host 150 and the FPUs 400.

FPUs 400, each having their own firmware, may receive a data read or a data write request from supervisor CPU 204 and, in response, access the appropriate one or more flash memory units 304 of a flash group 300. FPUs 400 may perform error correction on the data being retrieved from flash groups 300. Additionally, FPUs 400 may perform wear-leveling and bad block management operations that are conventionally performed by a single flash controller. FPUs 400 may also be configured to support interleaving operations to support the connection of one or more channels 302 of flash memory as shown in FIG. 3. With each FPU 400 configured to support interleaving operations and being connected to two flash channels 302, the memory capacity of SSD 100 of host 150 may be increased while at the same time reducing the bad block rate ("BBR") of the solid state memory device compared to conventional memory architectures.

Figure 7A:
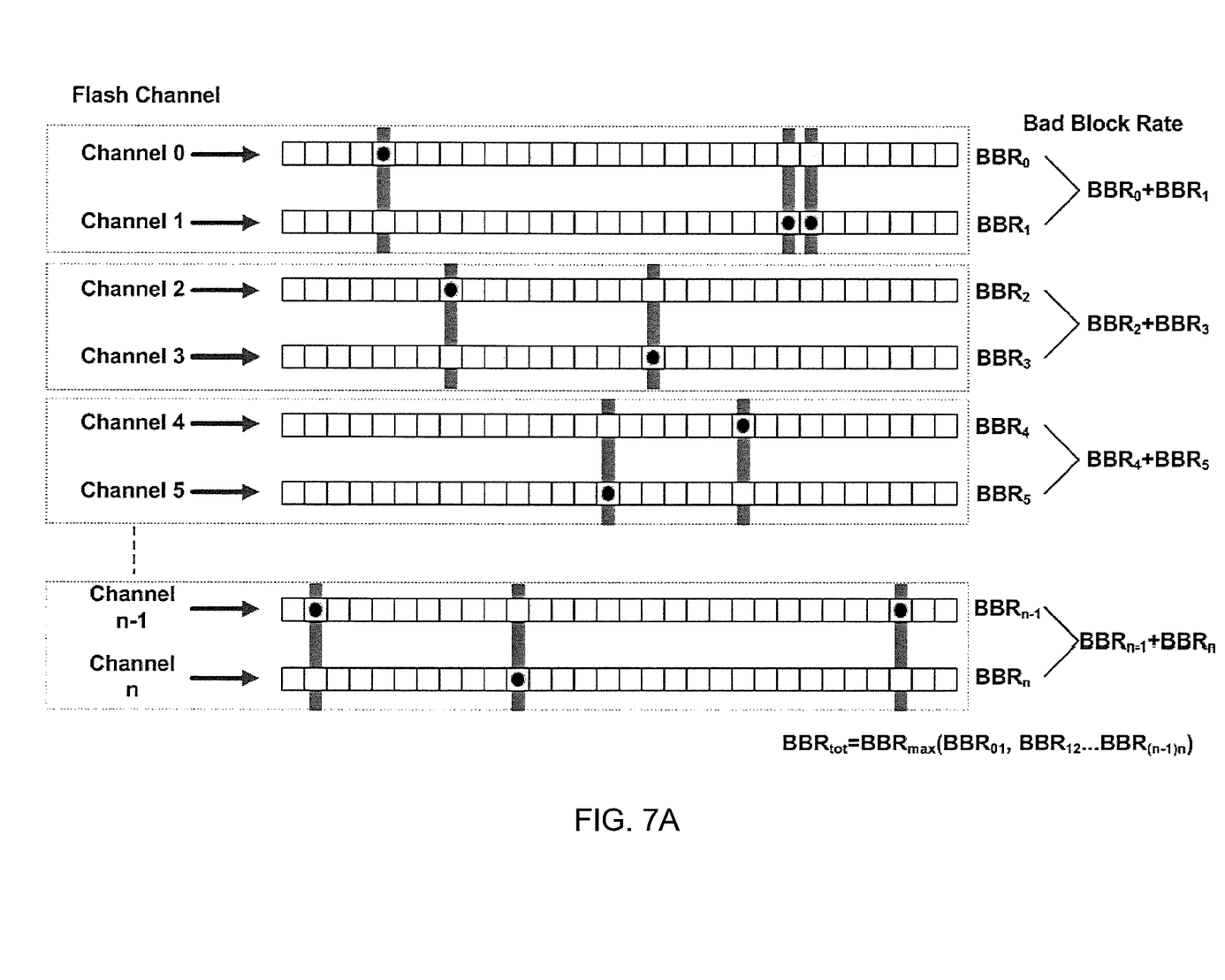
FIGS. 7A and 7B are block diagrams illustrating bad block management in an improved solid state drive architecture in accordance with FIGS. 1-5.

FIG. 7A illustrates one example of a plurality of memory channels in accordance with the solid state memory architecture illustrated in FIGS. 1-5. Each pair of memory channels illustrated in FIG. 7A are coupled to an FPU 400 configured to perform bad block management operations for the pair of channels to which it is coupled. The BBR for each pair of channels is equal to the sum of the BBR for each of the channels, which is determined by the FPU 400 coupled to the two channels. For example, the BBR for the first and second channels, $BBR_{01}$, is equal to the sum of the BBR for the first channel, $BBR_0$, and the BBR for the second channel, $BBR_1$ as the data blocks in the first and second channels are coupled together.

As described above, FPUs 400 may be coupled to one or more memory channels. When an FPU 400 is coupled to a single memory channel, the FPU 400 will determine the BBR of the memory channel to which it is coupled by dividing the number of bad blocks by the total number of memory blocks in the channel. The BBR for the memory channel determined by the FPU 400 is then reported to the supervisor CPU 204 to determine the BBR for the SSD as described below. When more than two memory channels are coupled to an FPU 400, the FPU 400 determines the BBR for each channel and sums together the BBR for each of the channels to determine the combined BBR, which is reported to supervisor CPU 204 on a per FPU 400 basis.

Supervisor CPU 204 receives the BBRs from each of the FPUs 400 and determines the total BBR of the SSD, $BBR_{tot}$. In some embodiments, $BBR_{tot}$ is set as the maximum BBR of all of the pairs of channels, e.g., $BBR_{tot}=BBR_{max}(BBR_{01}, BBR_{23} \ldots BBR_{(n-1)n})$. Setting $BBR_{tot}$ equal to the maximum BBR reported by the FPUs 400 ensures that the calculated capacity of the SSD is less than or equal to actual capacity of the solid state memory to prevent a host device 150 from sending a data write request to memory that exceeds the actual storage capacity of the SSD. For example, if the storage capacity of the SSD is 1 GB and the maximum reported BBR is three percent, then maximum storage capacity of the SSD would be set at 970 MB even though actual capacity may be 980 MB (assuming one gigabyte equals 1000 megabytes). The additional 10 MB would not be wasted as each of the FPUs handle the writing to the memory channels to which they are coupled and therefore may access each of the active memory blocks for wear-leveling and general storage. In some embodiments, $BBR_{tot}$ may be calculated by taking the average of the BBRs for the pairs of channels, e.g., $BBR_{tot}=[BBR_{01}+BBR_{23}+ \ldots +BBR_{(n-1)n}]/(n+1)$. Calculating the $BBR_{tot}$ by taking the average of the BBRs reported by the FPUs 400 provides a more accurate determination of available data storage in the SSD than taking the maximum reported BBR.

Figure 7B:
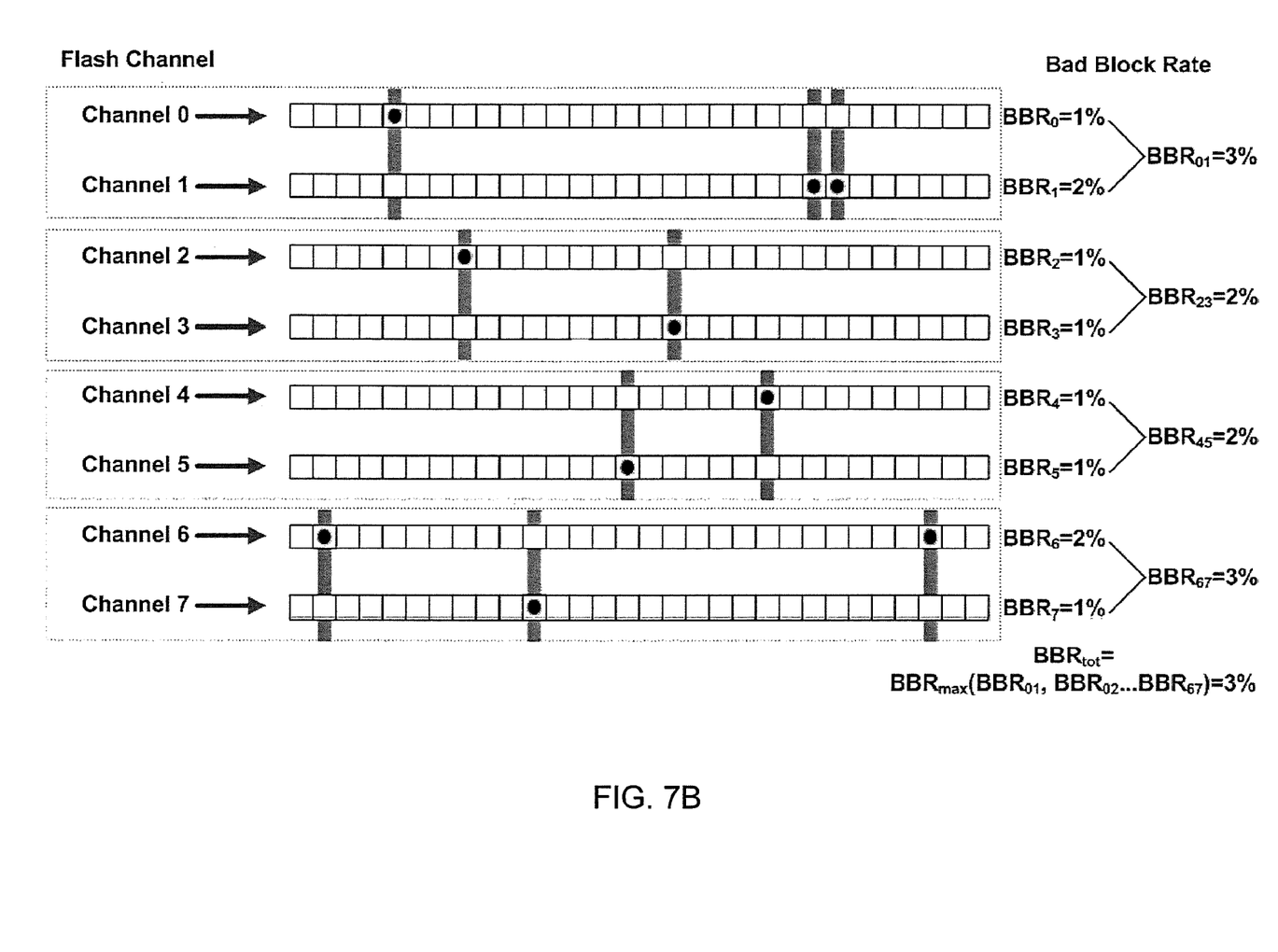

FIG. 7B illustrates an SSD architecture having eight memory channels with each pair of memory channels, e.g., channels 0 and 1, being controlled by a respective FPU 400 (FIG. 3). Assuming that each channel has 100 memory blocks, the BBR of the first channel, $BBR_0$, is one percent as there is one bad block out of the 100 total memory blocks. The BBR of the second channel, $BBR_1$, is two percent as there are two bad blocks out of the 100 total memory blocks. The combined BBR of the first and second channels, $BBR_{01}$, is three percent, which is the sum of $BBR_0$ and $BBR_1$. The combined BBR of the third and fourth channels, $BBR_{23}$, is two percent as is the combined BBR of the fifth and sixth channels, $BBR_{45}$, and the combined BBR of the seventh and eight channels, $BBR_{67}$, is three percent.

Supervisor CPU 204 (FIG. 2) receives the combined BBRs from each of the FPUs 400 and determines the BBR of the SSD, $BBR_{tot}$, which it will report to the host device 150. For example, the supervisor CPU 204 may determine $BBR_{tot}$ by taking the maximum combined BBR reported by the FPUs 400, e.g., three percent. Alternatively, the supervisor CPU 204 may determine $BBR_{tot}$ by taking the average of the reported combined BBRs, e.g., (3+2+2+3)/4=2.5 percent. The supervisor CPU 204 reports $BBR_{tot}$ and/or the total available storage space in the SSD to the host device 150 to prevent the host device 150 from attempting to send a data write request to the SSD that exceeds the available storage capacity of the SSD.

Figure 8:
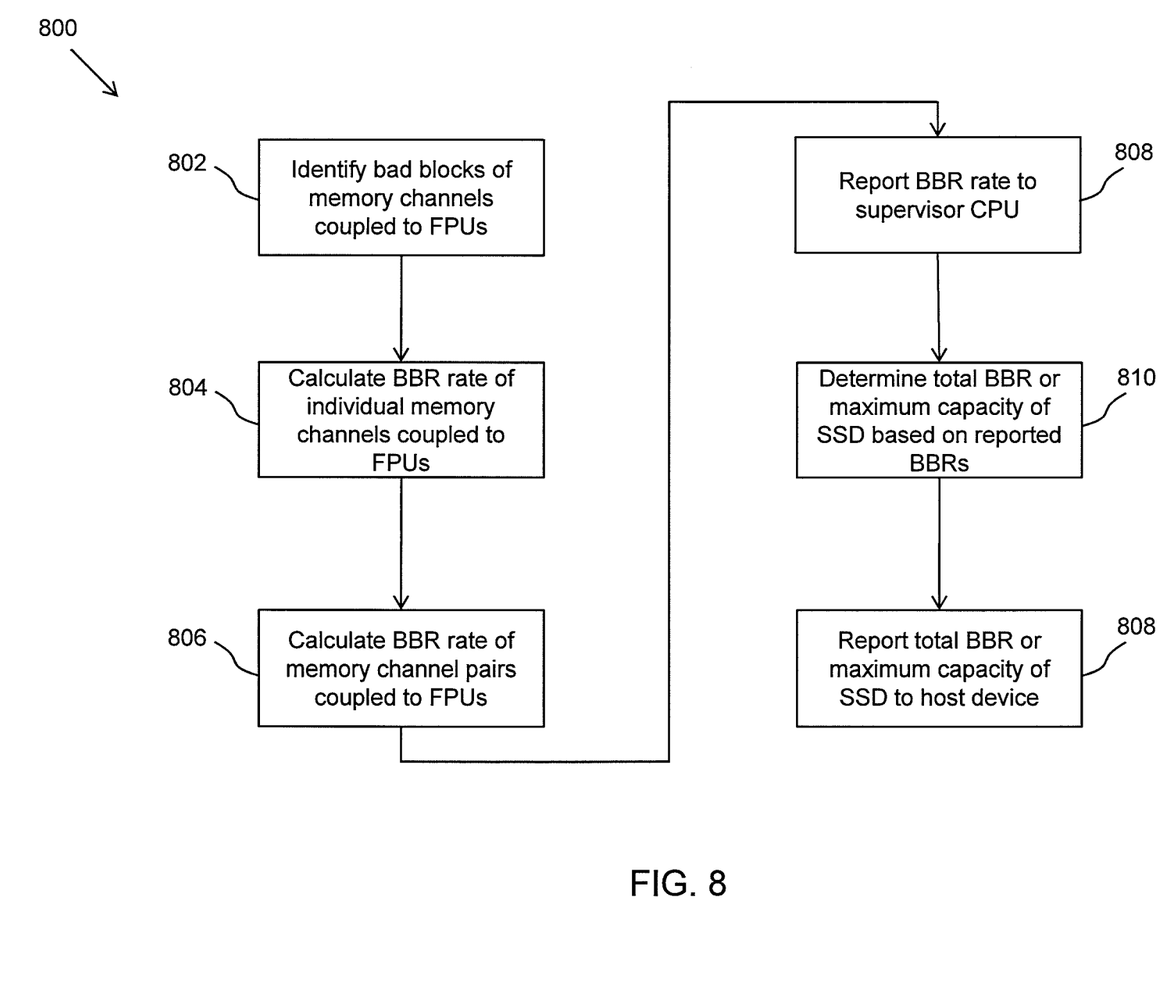
FIG. 8 is a flow diagram of one example of a method of performing bad block management in accordance with the solid state drive architecture illustrated in FIGS. 1-5.

FIG. 8 illustrates one example of a method 800 for bad block management that may be performed by an SSD controller 200. As shown in FIG. 8, the FPUs 400 identify if there are any bad memory blocks in each memory channel to which the FPUs are coupled at block 802. Each FPU 400 may locally store the address of each bad memory block in a computer readable storage medium to create a map of bad memory blocks in each memory channel.

At block 804, each FPU 400 calculates the BBR of each memory channel to which it is coupled. For example, each FPU 400 may divide the number of bad blocks in a memory channel by the total number of memory blocks in the memory channel to determine the BBR for the memory channel. The FPU 400 determines the combined BBR by summing together the BBRs for each memory channel to which it is coupled at block 806. Thus, if an FPU 400 is coupled to two memory channels, the combined BBR for the FPU is equal to the sum of the BBRs for each of the individual memory channels.

At block 808, the FPUs 400 report the combined BBRs to the supervisor CPU 204. The supervisor CPU 204 determines the total BBR for the SSD or the capacity of the SSD at block 810. For example, if the supervisor CPU 204 reports the total BBR of the SSD, then the supervisor CPU 204 may determine the total BBR of the SSD as the maximum BBR reported by the FPUs 400 or by calculating the average BBR based on the BBRs reported by the FPUs 400. Alternatively or additionally, if the supervisor CPU 204 reports the total capacity to host device 150, then supervisor CPU 204 may determine the total BBR of the SSD by taking the average of the combined BBRs reported by the FPUs and subtracting the total BBR to determine the total usable memory. For example, if the total memory capacity of the SSD is one gigabyte and the BBR for the SSD is two percent, then the actual capacity of the SSD is 980 MB (assuming there are 1000 megabytes in one gigabyte).

The total BBR of the SSD is reported to the host device 150 at block 808. Reporting the total BBR of the SSD and/or the SSD capacity to the host device 150 prevents the host device 150 from transmitting a write request in excess of the number of good memory blocks of the SSD.

The distributed processor architecture of the controller 200 reduces the workload of the supervisor CPU 204 by distributing the work among a plurality of RISC FPUs 400 thereby reducing latency times and enabling higher data transfer rates than may be achieved by conventional architectures. Additionally, the distributed architecture enables a single controller 200 to support various flash types, e.g., SLC, MLC, or a combination thereof, providing the flexibility to manufacture an SSD with an improved blend of reliability and performance. Moreover, the distributed architecture enables an FPU to perform bad block management on one or more memory data channels, which in turn advantageously enables the bad block rate of the entire memory device to be reduced compared to conventional memory architectures.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A memory controller, comprising:
   a plurality of processors of a first type each configured to be coupled to at least one memory channel of a solid state memory device, each of the plurality of processors of the first type configured to determine a bad block rate of the at least one memory channel to which it is configured to be coupled; and
   a processor of a second type in signal communication with each of the plurality of processors of the first type, the processor of the second type configured to:
      receive the bad block data rates from each of the plurality of processors of the first type, and
      report one of a total capacity or a bad block rate of the solid state memory device to a host device, the total capacity and the bad block rate of the solid state memory device based on the bad block rates received from each of the plurality of processors of the first type,
   wherein the bad block rate of the solid state memory device is determined by calculating an average of the bad block rates received from each of the plurality of processors of the first type.

2. The memory controller of claim 1, wherein a first one of the plurality of processors of the first type is configured to be coupled to two memory channels and to determine a bad block rate of each of the two memory channels.

3. The memory controller of claim 2, wherein the first one of the plurality of processors of the first type is configured to sum together the bad block rates of the two memory channels.

4. The memory controller of claim 1, wherein each of the plurality of processors of the first type is configured to be coupled to a respective pair of memory channels and to determine a bad block rate of the respective pair of memory channels.

5. The memory controller of claim 4, wherein the bad block rate of the respective pair of memory channels is equal to a sum of the bad block rates of memory channels of the respective pair of memory channels.

6. The memory controller of claim 1, wherein the processor of the second type is configured to calculate the total memory capacity of the solid state memory device based on the bad block rates received from each of the plurality of processors of the first type.

7. The memory controller of claim 1, wherein each of the plurality of processors of the first type are configured to maintain a map of bad blocks for the at least one memory channel to which it is configured to be coupled.

8. A method of performing bad block management of a solid state drive (SSD), comprising:
   identifying a first number of bad memory blocks of a first memory channel of the SSD at a first processor of a first type;

identifying a second number of bad memory blocks of a second memory channel of the SSD at a second processor of the first type;

calculating a bad block rate of the first memory channel at the first processor of the first type and a bad block rate of the second memory channel at the second processor of the first type, the bad block rate of the first memory channel based on the first number of bad memory blocks, the bad block rate of the second memory channel based on the second number of bad memory blocks;

determining a bad block rate of the SSD at a processor of a second type, the processor of the second type coupled to each of the processors of the first type; and transmitting one of a memory capacity value of the SSD or the bad block rate of the SSD from the processor of the second type to a host device, the bad block rate of the SSD and the memory capacity value of the SSD based on the bad block rates calculated by the processors of the first type, wherein the bad block rate of the SSD is equal to the greatest bad block rate calculated by the processors of the first type.

9. The method of claim 8, further comprising:

identifying a third number of bad memory blocks of a third memory channel of the SSD at the first processor of the first type;

calculating a bad block rate of the third memory channel at the first processor of the first type, the bad block rate of the third memory channel based on the third number of bad memory blocks; and summing together the bad block rates of the first and third memory channels at the first processor of the first type.

10. The method of claim 9, further comprising:

identifying a fourth number of bad memory blocks of a fourth memory channel of the SSD at the second processor of the first type;

calculating a bad block rate of the fourth memory channel at the second processor of the first type, the bad block rate of the fourth memory channel based on the fourth number of bad memory blocks; and summing together the bad block rates of the second and fourth memory channels at the second processor of the first type.

11. A system, comprising:

a memory controller coupled to a host device and to a solid state drive (SSD) having a plurality of memory channels, the memory controller including:

a plurality of processors of a first type each coupled to at least one of the plurality of memory channels of the SSD, each of the processors of the first type configured to:

identify a number of bad memory blocks in the memory channel to which it is coupled, and determine a bad block rate of the memory channel to which it is coupled based on the number of bad memory blocks in the memory channel, and a processor of a second type in signal communication with each of the plurality of processors of the first type, the processor of the second type configured to:

receive the bad block rates from each of the plurality of processors of the first type, and report one of a total capacity or a bad block rate of the SSD to the host device, the total capacity and the bad block rate of the SSD based on the bad block rates received from each of the plurality of processors of the first type wherein the bad block rate of the SSD is equal to the greatest bad block rate received from the plurality of processors of the first type.

12. The system of claim 11, wherein a first one of the plurality of processors of the first type is coupled to two memory channels and configured to determine a bad block rate of each of the two memory channels to which it is coupled.

13. The system of claim 12, wherein the first one of the plurality of processors of the first type is configured to sum together the bad block rates of the two memory channels to which it is coupled.

14. The system of claim 12, wherein each of the plurality of processors of the first type is coupled to a respective pair of memory channels and configured to determine a bad block rate of the respective pair of memory channels.

15. The system of claim 14, wherein the bad block rate of the respective pair of memory channels is equal to a sum of the bad block rates of each memory channel of the respective pair of memory channels.

16. A method of performing bad block management of a solid state drive (SSD), comprising:

identifying a first number of bad memory blocks of a first memory channel of the SSD at a first processor of a first type;

identifying a second number of bad memory blocks of a second memory channel of the SSD at a second processor of the first type;

calculating a bad block rate of the first memory channel at the first processor of the first type and a bad block rate of the second memory channel at the second processor of the first type, the bad block rate of the first memory channel based on the first number of bad memory blocks, the bad block rate of the second memory channel based on the second number of bad memory blocks;

determining a bad block rate of the SSD at a processor of a second type, the processor of the second type coupled to each of the processors of the first type; and transmitting one of a memory capacity value of the SSD or the bad block rate of the SSD from the processor of the second type to a host device, the bad block rate of the SSD and the memory capacity value of the SSD based on the bad block rates calculated by the processors of the first type, wherein the bad block rate of the SSD is equal to an average of the bad block rates calculated by the processors of the first type.

17. The method of claim 16, further comprising:

identifying a third number of bad memory blocks of a third memory channel of the SSD at the first processor of the first type;

calculating a bad block rate of the third memory channel at the first processor of the first type, the bad block rate of the third memory channel based on the third number of bad memory blocks; and summing together the bad block rates of the first and third memory channels at the first processor of the first type.

18. The method of claim 17, further comprising:

identifying a fourth number of bad memory blocks of a fourth memory channel of the SSD at the second processor of the first type;

calculating a bad block rate of the fourth memory channel at the second processor of the first type, the bad block rate of the fourth memory channel based on the fourth number of bad memory blocks; and summing together the bad block rates of the second and fourth memory channels at the second processor of the first type.

* * * * *